Sept. 26, 1967 W. MULDER 3,344,286
PULSE GENERATING CIRCUIT COMPRISING PENTODE, ZENER DIODE VOLTAGE DIVIDER BIAS MEANS AND TRANSISTOR FOR CONTROLLING PENTODE OUTPUT
Filed March 17, 1965
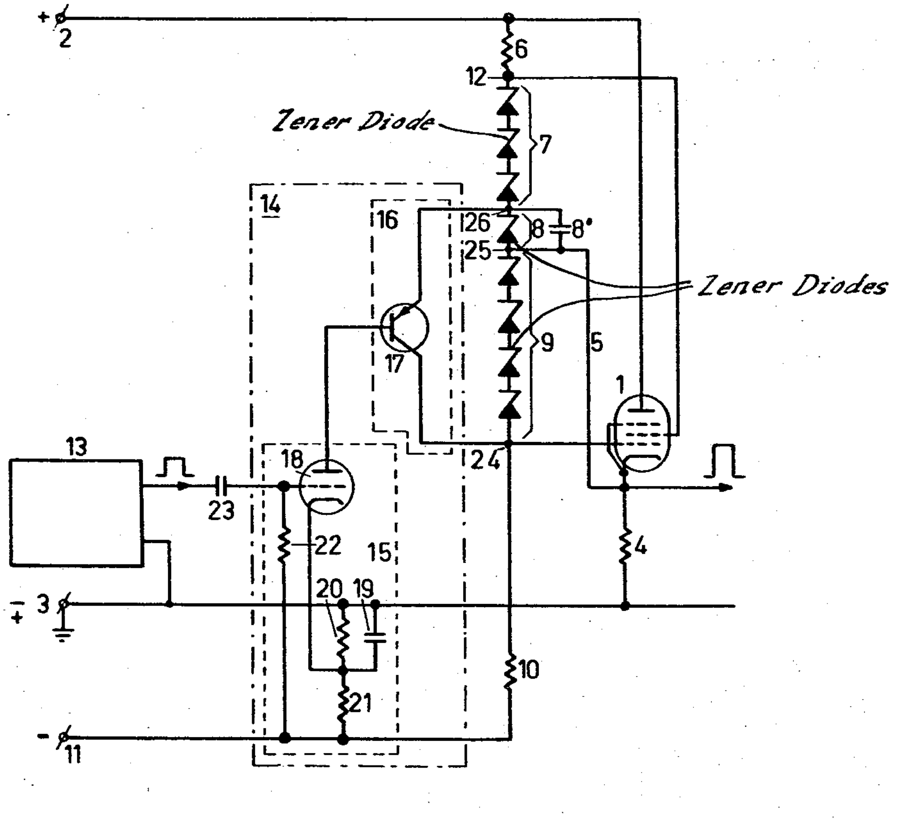
INVENTOR.
WILLEM MULDER
BY
Frank R. [signature]
AGENT

United States Patent Office

3,344,286

Patented Sept. 26, 1967

3,344,286

PULSE GENERATING CIRCUIT COMPRISING PENTODE, ZENER DIODE VOLTAGE DIVIDER BIAS MEANS AND TRANSISTOR FOR CONTROLLING PENTODE OUTPUT

Willem Mulder, Hengelo, Overijsel, Netherlands, assignor to N.V. Hollandse Signaalapparaten, Hengelo, Overijsel, Netherlands, a firm Filed Mar. 17, 1965, Ser. No. 440,399
Claims priority, application Netherlands, Mar. 18, 1964, 64—2,853
4 Claims. (Cl. 307—88.5)

ABSTRACT OF THE DISCLOSURE

The specification discloses a pulse generating circuit for producing rectangular pulses having a very short rise time. In the specific arrangement described, a pentode type output tube is normally maintained non-conductive by an appropriate bias voltage derived from two tappings of a voltage divider. A normally cut off transistor shunts the divider section and a normally cut off triode is connected to the input of the transistor. A positive going pulse from a generator renders the triode conductive for the duration of the input pulse. The consequent conduction of the transistor removes the blocking bias on the output tube to produce the desired output pulse.

The present invention relates to pulse generating circuit arrangements providing positive going rectangular pulses of very short rise time and large amplitude. More specifically the invention concerns a circuit arrangement of this type comprising an output tube with at least an anode, a cathode and a control grid, a first voltage source the negative terminal of which is connected to earth, means connecting the anode of said output tube to the positive terminal of said first voltage source, an output impedance, a reactance free element, and means connecting the cathode of the said output tube on the one hand to earth via the said output impedance and on the other hand to the control grid of the said output tube via the said reactance free element. The circuit further comprises a second voltage source the positive terminal of which is connected to earth, a voltage divider incorporating the said reactance free element and means connecting the said voltage divider between the positive terminal of said first voltage source and the negative terminal of the said second voltage source, whereby the voltage occurring across the said reactance free element causes the output tube to be normally cut off. A generator supplies rectangular pulses of small amplitude and switching means are provided adapted to make the said output tube conductive in response to received pulses from said generator.

Circuit arrangements of this type are useful for a variety of purposes. They are for instance suitable to be used as a driver for controlling a pulser in modulators of the so called "hard type" and they may also be used with radar-plan position indicators for temporarily increasing the energy applied to the deflection coils of such an indicator, so as to thereby obtain the very rapid deflections that are necessary in the case of interscan or intertrace marker representation.

One object of the invention is to provide a circuit arrangement of the aforementioned type which will yield output pulses with a very steep leading edge and a flat top.

Another object of the present invention is to provide a circuit arrangement of the said type in which the duration of the output pulses is easily controlled and in which the very steep leading edge and the flat top of the output pulses are maintained irrespective of the duration of the output pulses.

A still further object of the present invention is to provide a circuit arrangement of the said type in which the energy dissipation is negligible during the quiescent condition of the circuit arrangement.

According to the present invention there is provided a circuit arrangement as hereinbefore defined, wherein the said switching means comprise a first and a second electronic switch which in the quiescent condition are both non-conducting. The said first electronic switch is controlled by the rectangular output pulses from the said generator. The said second electronic switch is a transistor having an emitter, a collector and a base. The said circuit arrangement is further provided with a tap on said voltage divider, the potential of which is at least equal or higher than the potential applied to the cathode of the said output tube. A first current path is provided including means connecting the said voltage divider tap by way of the emitter and collector of the said transistor to the control grid of the said output tube thereby bridging a portion of the said voltage divider including the said reactance free element. Furthermore, a second current path is provided including means connecting the said voltage divider tap by way of the said first electronic switch and the emitter to base junction of the said transistor to earth, the latter path being normally interrupted by the said first electronic switch which in response to a received rectangular pulse from the said generator closes this second current path for the duration of such a rectangular pulse.

The invention will now be described in greater detail with reference to the accompanying drawing in which an embodiment of the circuit arrangement according to the invention is given by way of example only.

Referring to this embodiment there is shown an output tube 1 consisting of a pentode. The anode of this tube is connected to the positive terminal 2 of a voltage source, the negative terminal of which is connected to earth indicated by 3. The cathode of this tube is on the one hand connected to earth by way of an output impedance 4 and on the other hand to the control grid of the tube by way of a feed back circuit 5.

The feed back circuit 5 comprises a reactance free element 9 which forms part of a voltage divider consisting of the resistors 6 and 10 and the zener diodes 7, 8 and 9. This voltage divider is connected between the aforementioned positive terminal 2 and the negative terminal 11 of a second voltage source, the positive terminal of which is connected to earth 3. In the quiescent condition the output tube 1 is biased to cut-off by the voltage which occurs across the said reactance free element 9. The screen grid of this tube is connected to a tap 12 on the voltage divider 6–10. The circuit arrangement is further provided with a generator 13 furnishing rectangular pulses of small amplitude and electronic switching means 14 which is response to received rectangular pulses from said generator 13 cause the output tube 1 to conduct.

According to the invention a particularly favourable and altogether advantageous embodiment of such a circuit arrangement is obtained if the said switching means 14 comprises a first electronic switch 15 and a second electronic switch 16 which in the quiescent condition are both nonconducting. The said first electronic switch 15 is controlled by the rectangular output pulses from the said generator 13. The second electronic switch 16 comprises a transistor 17 having an emitter, a collector and a base. The said circuit arrangement is further provided with a tap 26 on said voltage divider 6–10, the potential of which is at least equal or higher than the potential applied to the cathode of the said output tube 1. A first current path is provided including means connecting the said voltage divider tap 26 by way of the emitter and collector of the said transistor 17 to the control grid of the said output tube 1 thereby bridging a portion 8, 9 of the said voltage divider 6–10 including the said reactance free element 9. In addition a second current path is provided including means connecting the said voltage divider tap 26 by way of the said first electronic switch 15 and the emitter to base junction of the said transistor 17 to earth, the latter path being normally interrupted by the said first electronic switch 15 which in response to received rectangular pulses from the said generator 13 closes this second current path for the duration of such a rectangular pulse.

In the embodiment shown, the first electronic switch 15 consists of a triode 18. The cathode of this tube is connected to earth via a resistor 20 bridged by a capacitor 19. The resistor 20 together with a resistor 21 forms a voltage divider which is connected between the terminals 3 and 11 of the said second voltage source. By way of a resistor 22, the control grid of the triode 18 is connected to the negative terminal 11, the potential of which is such that the said triode is normally biased to cut-off. The control grid of the triode is further connected to the output of the generator 13 by way of a coupling condenser 23.

The second electronic switch 16, in the shown embodiment, consists of a PNP-transistor 17 the base of which is directly connected to the anode of the triode 18. The collector of this transistor is connected to the control grid of the output tube 1 and to the extremity 24 of the reactance free element 9 while the emitter of the said transistor is connected to the tap 26 of the voltage divider and through the portion 8 of the said voltage divider 6–10 to the other extremity 25 of the said reactance free element and to the cathode of the output tube 1. The portion 8 of the said voltage divider is bridged by a buffer condenser 8'. In the shown embodiment the portions 7, 8 and 9 of the voltage divider 6–10 consist of a number of series connected zener-diodes which, owing to their favourable current/voltage characteristic are advantageous in that with relatively large variations of the current through the voltage divider, there will only occur relatively small voltage variations at the tapping points of the voltage divider.

With regard to the operation of this circuit arrangement two current paths may be distinguished i.e. a first current path connecting the positive terminal 2 by way of the resistor 6, the voltage divider portion 7, the emitter and collector of the transistor 17 and the resistor 10 to the negative terminal 11, and a second current path connecting the positive terminal 2 by way of the resistor 6, the voltage divider portion 7, the emitter to base junction of the transistor 17 and the first electronic switch formed by triode 18 to the earthed terminal 3. In the quiescent condition of the circuit arrangement the tubes 1 and 18 as well as the transistor 17 are nonconducting. Therefore, the said second current path being interrupted by the tube 18, the said first current path is interrupted by the very high dynamic resistance of the transistor 17 and there will be a little energy dissipated in the voltage divider 6–10. Assuming now, that a positive rectangular output pulse from said generator 13 is applied to the control grid of the tube 18, this tube becomes conductive and accordingly, the said second current path thus being closed, a current will flow via the emitter to base junction of the transistor 17. Transistor 17 is thereby brought in a condition in which the very high internal dynamic resistance present between the emitter and collector of this transistor suddenly drops to an extremely low value so that now a current is permitted to flow through the said first current path.

As the emitter and the collector of the transistor 17 are respectively connected to the tapping points 26 and 24 it will be clear, that at the instant at which the said first current path is closed, the voltage divider portion 8, 9 of the said voltage divider 6–10 will be practically short-circuited by the emitter-collector path of the said transistor 17 and that accordingly the potential which now occurs at the control grid of the output tube 1 will only slightly differ from the potential occurring at the voltage divider tap 25. The potential of this voltage divider tap 25 is chosen to be such that the control grid of the output tube 1 becomes positive with respect to its cathode to such an extent, that the tube 1 draws grid-current and therefore will present only a small internal resistance. The instant the tube 1 is thus made to conduct there flows a current through the output impedance 4 which very rapidly increases. The potential at the cathode of the tube 1 will increase just as fast. The potentials occurring at the control grid and the screen grid of the tube 1 follow the increase of the cathode potential owing to the fact that the portions 7, 8 and 9 of the voltage divider 6–10 are decoupled from the terminals 2 and 11 by means of the resistors 6 and 10 which here function as decoupling resistors. It will be clear that the very rapid increase of the cathode potential causes the leading edge of the output pulse of the tube 1 to be extremely steep. After a rise time which is very short, the cathode potential arrives at its top value which thereafter remains constant as long as the rectangular pulse from the said pulse generator 13 holds the triode 18 in its conductive state. Therefore the output pulse possesses a top which is completely flat. Due to the fact, that time-dependent elements such as pulse transformers and pulse forming networks are avoided with the circuit arrangement according to the invention, the flat top of the output pulse will not be influenced by the duration of the pulse.

With the occurrence of the trailing edge of the rectangular pulse supplied to the control grid of triode 18, this tube returns to its quiescent condition with the result, that the aforementioned first and second current paths are interrupted and that the output tube 1 returns to its nonconductive state. The return of the output tube to its original nonconducting state can be accelerated by well-known means, so that the output pulse may also have a steep trailing edge.

The extremely steep edges of the pulses obtained with the circuit arrangement according to the invention are also due to the fact that the first electronic switch (triode 18) has only small input and output parasitic capacitance, since this tube need not carry large currents and therefore can be a tube of small power.

The invention is not restricted to the embodiment shown. In this embodiment, for instance, the first electronic switch 15 formed by the triode 18, may be substituted by an NPN-transistor. It is also possible, to use a PNP-transistor as first electronic switch, provided the transistor 17 is substituted by a transistor of the opposite conductivity type. It will be evident that the generator 13 in that case will have to provide negative instead of positive going rectangular pulses.

What I claim is:

1. A pulse generating circuit arrangement comprising an output tube having a cathode, an anode and a control grid, an output circuit including said cathode and anode, an output impedance in said output circuit, a voltage divider network comprising a reactance free impedance, means connecting the cathode and control electrode of said output tube at tappings of said network providing a biasing potential to said tube normally maintaining the same nonconductive, a transistor having emitter and collector electrodes forming a current path shunting said reactance free impedance and having a base electrode, an electron discharge device having an output electrode connected to said base electrode and forming therewith a current path and having an input electrode, means for applying a biasing potential to the said input electrode of said electron discharge device to maintain said electron discharge device normally nonconductive and to interrupt the said current path to the base of said transistor, and means for applying to the input electrode of said electron discharge device a pulse signal having a polarity rendering said electron discharge device and said transistor conductive for the interval of said pulse signal, the conduction of said transistor during the pulse interval bridging said reactance free impedance and rendering said output tube conductive for the interval of said pulse signal.

2. Circuit arrangement as claimed in claim 1 wherein the said electron discharge device consists of a tube having at least an anode, a cathode and a control grid, the grid of said tube being connected to the negative terminal of a biasing voltage source and to said pulse signal means, and wherein said transistor consists of a PNP transistor the base of which is directly connected to the anode of the said tube.

3. Circuit arrangement as claimed in claim 1 wherein the said transistor consists of a PNP transistor and wherein one end of the said reactance free impedance is connected to the cathode of the output tube and to the emitter of the said transistor by way of a portion of the said volage divider network, said portion being bridged by a buffer condenser.

4. Circuit arrangement as claimed in claim 1 wherein the said voltage divider network comprises a number of series-connected zener diodes, and wherein the said reactance free impedance is formed by one or a number of these zener diodes.

References Cited

UNITED STATES PATENTS

| | | | |
|---|---|---|---|
| 3,056,891 | 10/1962 | Kabell | 307—88.5 |
| 3,139,562 | 6/1964 | Freeborn | 317—148.5 |
| 3,195,055 | 7/1965 | Dean | 328—162 |

ARTHUR GAUSS, *Primary Examiner.*

S. D. MILLER, *Assistant Examiner.*